No. 661,602. Patented Nov. 13, 1900.
A. F. GARESCHÉ.
FILTER.
(Application filed Aug. 6, 1900.)
(No Model.)

Attest:
Wm H Ford
George Bakewell

Inventor:
Arthur F Garesché,
by Bakewell & Cornwall
Attys.

THE NORRIS PETERS CO., PHOTO-LITHO., WASHINGTON, D. C.

UNITED STATES PATENT OFFICE.

ARTHUR F. GARESCHÉ, OF ST. LOUIS, MISSOURI, ASSIGNOR OF ONE-HALF TO THE E. F. W. MEIER CHINA AND GLASS COMPANY, OF SAME PLACE.

FILTER.

SPECIFICATION forming part of Letters Patent No. 661,602, dated November 13, 1900.

Application filed August 6, 1900. Serial No. 26,023. (No model.)

*To all whom it may concern:*

Be it known that I, ARTHUR F. GARESCHÉ, a citizen of the United States, residing at the city of St. Louis, State of Missouri, have invented a certain new and useful Improvement in Filters, of which the following is a full, clear, and exact description, such as will enable others skilled in the art to which it appertains to make and use the same, reference being had to the accompanying drawings, forming part of this specification, in which—

Figure 1:
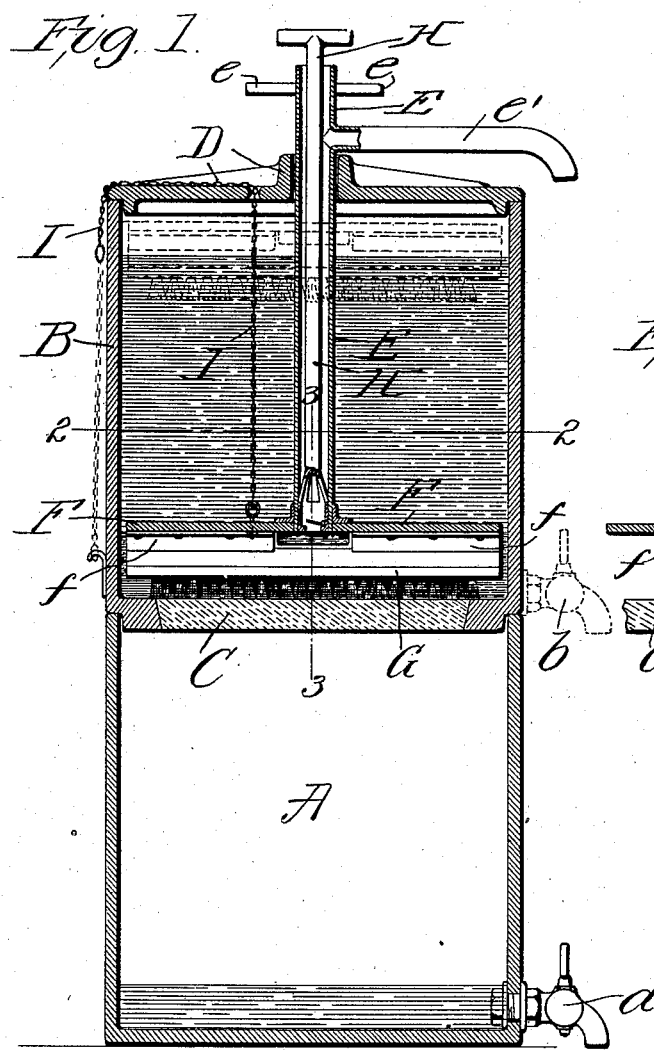
Figure 3:
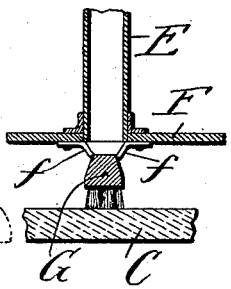
Figure 2:
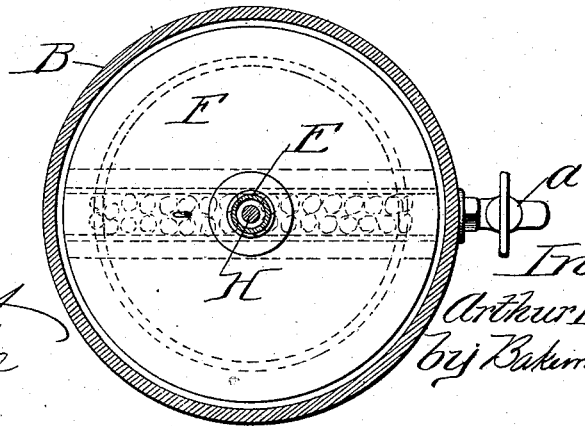

Figure 1 is a vertical sectional view of my improved filter. Fig. 2 is a horizontal sectional view on line 2 2, Fig. 1; and Fig. 3 is a vertical sectional view on line 3 3, Fig. 1, the plunger being omitted.

This invention relates to a new and useful improvement in filters, and particularly to the devices hereinafter described for cleaning the filtering material, the object being to enable the filtering material being cleansed from the exterior without dismantling the filter, the dirty water resulting from the cleaning operation being confined in a chamber, from which it may be racked or drawn off by suitable devices.

With this object in view the invention consists in the construction, arrangement, and combination of the several parts, all as will be hereinafter described and afterward pointed out in the claims.

In the drawings, A indicates a receptacle for receiving the filtered water, said receptacle being preferably provided with a spigot $a$.

B indicates a receptacle for containing the water to be filtered, said receptacle preferably carrying a panel C in its bottom, forming the filtering material. This construction obtains where a gravity-filter is employed; but it is obvious that in pressure-filters the filtering material may be located at a different point.

The receptacle B is preferably provided with a removable cover D, which, as shown in the drawings, has an opening in its center, through which passes a rod or tube E, which rod or tube is provided with handles $e$ on its upper protruding end, whereby said rod and its carried parts may be rotated as desired. The lower end of rod E carries a disk F, which is of slightly-smaller diameter than the receptacle B, both said disk and said receptacle being preferably circular in cross-section, as shown in Fig. 2. This disk is provided with ways $f$ on its under surface, in which ways is designed to be slid a brush G. The back of this brush, as shown in Fig. 3, is so shaped as to be dovetailed into the ways $f$.

In operation it will be obvious that by rotating the brush the surface of the filtering material will be cleansed, the dirty water resulting from the cleaning operation being confined below the disk F and not permitted to mingle with the water above said disk to be filtered. When the filtering-surface is cleansed, a spigot $b$ may be opened to draw off the dirty water beneath the disk, the cleaner water above flowing around the disk on all sides as the dirty water is removed.

As shown in Fig. 1, a plunger H may be arranged in the tube E, the lower end of said tube opening into the compartment below the disk F, the cleats forming the ways $f$ and the back of the brush being cut away opposite the tube E to give access of the dirty water to the tube. When the plunger H is reciprocated, the dirty water is pumped from under disk F and elevated in the hollow tube until it reaches a spout $e'$, under which spout a bucket or other receptacle may be placed. By thus providing a centrally-located exit for the dirty water the water above the disk F will flow around and under the edges of said disk uniformly on all sides, so that all of the dirty water will be removed from above the filter-surface.

As it is not necessary that the cleansing apparatus should remain in an operative position at all times, a chain I is provided, whereby when the cleansing apparatus is elevated in the receptacle, as shown by dotted lines in Fig. 1, said chain by being attached to a hook arranged at some suitable point will hold the cleansing apparatus in its elevated position.

I am aware that minor changes in the arrangement, construction, and combination of the several parts of my device can be made and substituted for those herein shown and described without in the least departing from the nature and principle of my invention.

Having thus described my invention, what I claim, and desire to secure by Letters Patent, is—

1. In a filter, the combination with a suitable receptacle and filtering material, of a device designed to coöperate with the surface of the filtering material to cleanse the latter, a disk for confining the dirty water in a space adjacent to said filtering material, means for operating the cleansing apparatus, and means for drawing the dirty water resulting from the cleansing operation, from the filter; substantially as described.

2. In a filter, the combination with a suitable receptacle and filtering material, of a rod, a disk carried by said rod, said disk being of slightly-smaller diameter than the receptacle, and a brush mounted upon said disk for cleansing the surface of the filtering material; substantially as described.

3. In a filter, the combination with a receptacle and filtering material, of a hollow rod, a disk mounted upon the end of said rod, a brush carried by said disk for cleansing the surface of the filtering material, and a plunger located in the hollow rod for drawing the water resulting from the cleansing operation, through the hollow rod; substantially as described.

4. In a filter, the combination with a suitable receptacle and filtering material, of a device designed to coöperate with the surface of the filtering material to cleanse the latter, a disk for confining the dirty water in a space adjacent to said filtering material, means for operating the cleansing apparatus, and means for holding said disk and said cleansing device out of operative relation to the surface of said material; substantially as described.

5. In a device for cleaning the surface of filtering material, the combination with a hollow rod, of a plunger in said rod, a disk carried by said rod, ways provided on said disk for the reception of the brush, and a brush, said brush and ways being cut away opposite the hollow rod to give access to the open end thereof; substantially as described.

In testimony whereof I hereunto affix my signature, in the presence of two witnesses, this 2d day of August, 1900.

ARTHUR F. GARESCHÉ.

Witnesses:
WM. H. SCOTT,
GEORGE BAKEWELL.